(12) United States Patent
Shrader

(10) Patent No.: US 6,851,060 B1
(45) Date of Patent: Feb. 1, 2005

(54) USER CONTROL OF WEB BROWSER USER DATA

(75) Inventor: Theodore Jack London Shrader, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/353,950

(22) Filed: Jul. 15, 1999

(51) Int. Cl.$^7$ ............................. G06F 13/00; H04L 9/32
(52) U.S. Cl. ........................ 713/201; 713/200; 713/202; 709/203; 709/219; 709/217; 709/229; 707/9; 707/10
(58) Field of Search ................................. 713/201, 200, 713/202; 709/203, 219, 229, 217, 224, 227; 707/10, 9, 5; 705/26, 52

(56) References Cited

U.S. PATENT DOCUMENTS

| | | | |
|---|---|---|---|
| 5,623,601 A | 4/1997 | Vu | 395/187.01 |
| 5,644,711 A | 7/1997 | Murphy | 395/188.01 |
| 5,678,041 A | 10/1997 | Baker et al. | 395/609 |
| 5,708,780 A | 1/1998 | Levergood et al. | 395/200.12 |
| 5,734,831 A | 3/1998 | Sanders | 395/200.53 |
| 5,768,519 A | 6/1998 | Swift et al. | 395/200.53 |
| 5,796,952 A | 8/1998 | Davis et al. | 395/200.54 |
| 5,805,803 A | 9/1998 | Birrell et al. | 395/187.01 |
| 5,835,092 A * | 11/1998 | Boudreau et al. | 345/808 |
| 5,875,296 A | 2/1999 | Shi et al. | 395/188.01 |
| 6,085,224 A * | 7/2000 | Wagner | 709/203 |
| 6,092,196 A * | 7/2000 | Reiche | 713/200 |
| 6,182,229 B1 * | 1/2001 | Nielsen | 713/202 |
| 6,199,113 B1 * | 3/2001 | Alegre et al. | 709/229 |
| 6,237,033 B1 * | 5/2001 | Doeberl et al. | 709/223 |
| 6,374,359 B1 * | 4/2002 | Shrader et al. | 713/201 |

FOREIGN PATENT DOCUMENTS

| | | | |
|---|---|---|---|
| EP | 0875844 | 11/1998 | G06F/17/30 |
| JP | 10-257048 | 9/1998 | H04L/9/32 |
| WO | WO 99/0096 | 1/1999 | H04L/29/06 |

OTHER PUBLICATIONS

IBM Research Disclosure 41460, "Extra Transaction Suppression during Web Browser Collaboration", Oct. 1998, p. 1375.

IBM Technical Disclosure Bulletin, "Persistent Context for World Web Browsers", vol. 40, No. 02, Feb. 1997, pp. 215–216.

Mayer, "Internet Privacy. The Internet and Privacy Legislation: Cookies for a Treat?", Computer Law and Security Report, vol. 14, No. 3, pp. 166–174, May–Jun. 1998, ABSTRACT.

Helling, "Web–Site Sensitivity to Privacy Concerns: Collecting Personally Identifiable Information and Passing Persistent Cookies", First Monday, vol. 3, No. 2, Feb. 2, 1998, ABSTRACT.

Highland, "The Cookie Monster [Data Privacy]", EDPACS, vol. 24, No. 6, pp. 16–18, Dec. 1996, ABSTRACT.

Tichenor, "JavaScript Cookies", Dr. Dobb's Journal, vol. 22, No. 5, pp. 42–45, May 1997, ABSTRACT.

* cited by examiner

Primary Examiner—Ly V. Hua
(74) Attorney, Agent, or Firm—Duke W. Yee; Jeffrey S. LaBaw; Wayne P. Bailey

(57) ABSTRACT

A mechanism to dynamically present basic authentication and cookie information to a web browser user. As part of a login, a user will have entered a userid and password as part of the basic authentication process. He or she also can configure the web browser to display cookies that are sent to the browser for setting. After their initial display, however, this information is either hidden or not easily accessible to the user. The present invention is a mechanism that allows a web browser user easy access to his or her logged-on userid and cookies.

42 Claims, 6 Drawing Sheets

USER CONTROL OF WEB BROWSER USER DATA

BACKGROUND OF THE INVENTION

1. Technical Field

The present invention relates generally to web browsing and, in particular, to a method and mechanism for dynamically presenting user data (e.g., basic authentication and cookie information) to a web browser user.

2. Description of the Related Art

The World Wide Web is the Internet's multimedia information retrieval system. In the web environment, a client machine and, in particular, a web browser, effects transactions to web servers using the Hypertext Transfer Protocol (HTTP), which is a known application protocol providing users access to files (e.g., text, graphics, images, sound, video, etc.) using a standard page description language known as Hypertext Markup Language (HTML). HTML provides basic document formatting and allows the developer to specify "links" to other servers and files. In the Internet paradigm, a network path to a server is identified by a so-called Uniform Resource Locator (URL) having a special syntax for defining a network connection. Use of an HTML-compatible browser (e.g., Netscape Navigator or Microsoft Internet Explorer) at a client machine involves specification of a link via the URL. In response, the client makes a request to the server identified in the link and, in return, receives a document or other object formatted according to HTML. A collection of documents supported on a web server is sometimes referred to as a web site.

A web browser automatically stores certain user data during the process of the user browsing the Internet. Thus, for example, the HTTP protocol uses so-called "basic authentication" to enable a user to present a login, typically a userid and password, to browse content on a given site. The basic authentication function works as follows. When the web browser receives a HTTP 401 unauthorized return code from a web server as part of the HTTP transaction if the user is not logged on to the specified realm, the web browser displays a dialog box prompting the user for his or her userid and password. This userid/password is then passed along with every HTTP transaction to URLs in the specified realm. The userid and password are not visible to the user thereafter unless the receiving CGI script on the web server wishes to display the value. However, the userid and password are kept for all instances of the web browser as long as a session of the web browser exists.

Thus, once the user logs into a realm, the browser maintains the basic authentication data during the browsing session. After login, however, the basic authentication data is either hidden or not easily accessible to the user, which is undesirable. Thus, for example, assume that an administrator on an intranet has logged in as a simple user but then decides that he or she decrees to assume administrative duties. In the prior art, a user cannot login as a first user and then login as a second user during the same session without first logging off or closing down the browser.

Another type of user data is a so-called "cookie." Because HTTP is a stateless protocol, a cookie can be set by a server to customize data to a particular user's web browser. Cookies thus provide a degree of "state" to HTTP. By default, a browser automatically stores cookie data without giving the user the option or knowledge of it being done. When a cookie is set as part of a HTTP transaction, it will include the path the cookie is valid for, the cookie's name and value, and other optional attributes, such as the expiration date for the cookie. In the prior art, a user can configure his or her web browser to show the cookie that the web server is attempting to set in a dialog box along with the options to set or cancel the cookie. After this initial display, the cookie value is unavailable for viewing or modification by the user. The browser may store cookie values in a text file, but this file can only be viewed outside of the browser and may only be updated when the browser is closed.

Thus, like basic authentication data, cookie data typically is not exposed to the user. Thus, for example, after a user has agreed to accept cookies, there is no easy way for the user to modify the cookie without first bringing down the browser.

It would be highly desirable to provide a web browser user with more control over what authentication and cookie data is stored on his or her behalf by a web browser or any other HTTP client application. The present invention addresses this problem.

BRIEF SUMMARY OF THE INVENTION

A web browser user data control mechanism dynamically presents basic authentication and/or cookie information to the web browser user. The mechanism has two primary components: a basic authentication display routine and a cookie data display routine.

The basic authentication display routine presents the logged on userid for the user as part of the text and icons that remain visible above the web browser frame. Preferably, the web browser dynamically displays the basic authentication userid value based on the current URL. Some URLs may not have a userid associated with them. If desired, a userid and non-userid icon may be placed next to the userid or "not logged in" text for further visual identification. The realm name may also be appended. This feature allows the user to immediately know whether or not they are logged into a site.

The basic authentication display routine also allows the user an option to flush the basic authentication userid and password associated with a domain or realm. Preferably, this option is made available when the user clicks on the displayed userid and selects a "logoff" menu item. Thus, the user is prompted by the web browser again when the web server returns a 401 return code due to protected access. This feature is useful for administration CGIs where the user may have more than one account that the user needs to switch between without having to take the web browser down.

The cookie display routine displays cookie data that is sent to the web browser from a given web server. The display routine places a cookie icon as part of the text and icons that remain visible above the web browser frame. The web browser displays a no-cookie icon if no cookies are set for the path. When the user selects the cookie icon, the browser displays a dialog box showing all the stored cookie values for the URL or path. A display in the dialog box shows the attributes of each cookie and scroll bars may be used to let the user browse all the values. Buttons at the bottom of the dialog box allow the user to delete or modify an existing cookie value. If desired, the cookie display routine could allow additional cookie values to be set. In addition, the cookie display routine could allow the user to view, edit, or delete all cookie values, not just ones for the current URL.

The cookie data display routine also enables a user to block all cookies from a particular site, such as a web server that returns nothing but advertisement graphics to subscribing URLs.

The foregoing has outlined some of the more pertinent objects and features of the present invention. These objects should be construed to be merely illustrative of some of the more prominent features and applications of the invention. Many other beneficial results can be attained by applying the disclosed invention in a different manner or modifying the invention as will be described. Accordingly, other objects and a fuller understanding of the invention may be had by referring to the following Detailed Description of the Preferred Embodiment.

BRIEF DESCRIPTION OF THE DRAWINGS

For a more complete understanding of the present invention and the advantages thereof, reference should be made to the following Detailed Description taken in connection with the accompanying drawings in which.

DETAILED DESCRIPTION OF THE PREFERRED EMBODIMENT

Figure 1:
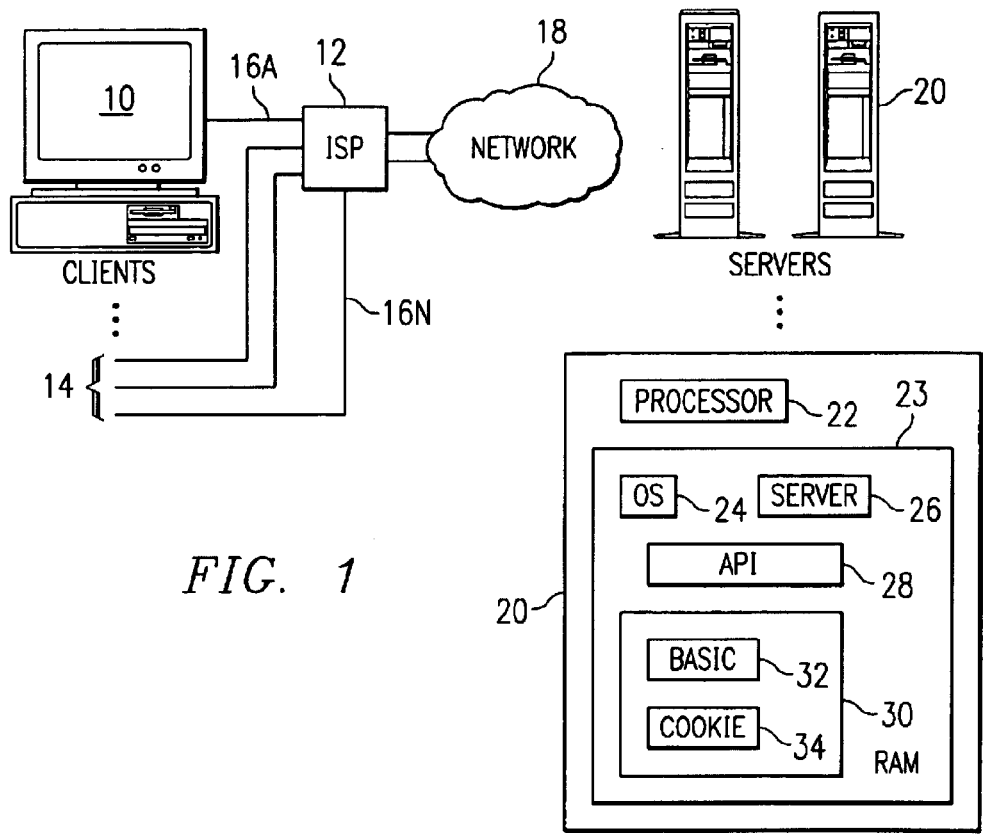
FIG. 1 is a simplified illustration of a client-server environment in which the present invention may be implemented.

A representative system in which the present invention is implemented is illustrated in FIG. 1. A plurality of Internet client machines 10 are connectable to a computer network Internet Service Provider (ISP) 12 via a network such as a dialup telephone network 14. As is well known, the dialup telephone network usually has a given, limited number of connections 16a–16n. ISP 12 interfaces the client machines 10 to the remainder of the network 18, which includes a plurality of web content server machines 20. Network 18 typically includes other servers (not shown) for control of domain name resolution, routing and other control functions. A client machine typically includes a suite of known Internet tools, including a Web browser, to access the servers of the network and thus obtain certain services. These services include one-to-one messaging (e-mail), one-to-many messaging (bulletin board), on-line chat, file transfer and browsing. Various known Internet protocols are used for these services. Thus, for example, browsing is effected using the Hypertext Transfer Protocol (HTTP), which provides users access to multimedia files using Hypertext Markup Language (HTML). The collection of servers that use HTTP comprise the World Wide Web, which is the Internet's multimedia information retrieval system.

A given client machine and the server may communicate over the public Internet, an intranet, or any other computer network. If desired, given communications may take place over a secure connection. Thus, for example, a client may communication with the server using a network security protocol, such as Netscape's Secure Socket Layer (SSL) protocol or the IETF's Transport Layer Security (TLS) protocol.

A representative client is a personal computer, notebook computer, Internet appliance or pervasive computing device (e.g., a PDA or palm computer) that is Pentium, PowerPC®- or RISC-based. The client includes an operating system such as Microsoft Windows, Microsoft Windows CE or PalmOS. As noted above, the client includes a suite of Internet tools including a Web browser, such as Netscape Navigator or Microsoft Internet Explorer, that has a Java Virtual Machine (JVM) and support for application plug-ins or helper applications. The browser includes support for basic authentication (i.e. user login to a server via userid and password) as well as server-set cookie data. These are conventional browser functions.

A representative web server is an IBM Netfinity server comprising a RISC-based processor 22, a UNIX-based operating system 24 and a web server program 26. OS 24 and web server program 26 are supported in system memory 23 (e.g., RAM). The server may include an application programming interface 28 (API) that provides extensions to enable application developers to extend and/or customize the core functionality thereof through software programs including plug-ins, CGI programs, applets, and the like.

One such program is a web browser user data control mechanism 30 of the present invention. As illustrated in FIG. 1, the web browser user data control mechanism that dynamically presents basic authentication and/or cookie information to the web browser user. The inventive mechanism has two primary components: a basic authentication display routine 32, and a cookie data display routine 34. The components would preferably exist on the web browser application. It would exist on the server if the web browser was being run on the server.

As described above, as part of a login, a user will have entered a userid and password as part of the basic authentication process. He or she also can configure the web browser to display cookies that are sent to the browser for setting. After their initial display, however, this information is either hidden or not easily accessible to the user. The user data control mechanism 30 allows the web browser user easy access to their logged-on userid and cookies.

In particular, the basic authentication display routine 32 enables the web browser user to ascertain the userid/password under which he or she is logged in as part of basic authentication (assuming he or she did so). According to the invention, the basic authentication display routine 32 presents the logged on userid for the user as part of the text and icons that remain visible above the web browser frame. Preferably, the web browser dynamically displays the basic authentication userid value based on the current URL. Some URLs may not have a userid associated with them. If desired, a userid and non-userid icon may be placed next to the userid or "not logged in" text for further visual identification. The realm name could also be appended. This feature allows the user to immediately know whether or not they were logged into a site.

The basic authentication display routine 32 also allows the user an option to flush their basic authentication userid and password associated with a domain or realm. Preferably, this option is made available when the user clicks on the displayed userid and selects a "logoff" menu item. Thus, the user is prompted by the web browser again when the web server returns a 401 return code due to protected access. The user would then have to login to the domain or realm again. This feature is useful for administration CGIs where the user may have more than one account, such as cell_admin and user1, that the user needs to switch between without having to take the web browser down.

The cookie display routine 34 displays cookie data that is sent to the web browser from a given web server. The display routine 34 places a cookie icon as part of the text and icons that remain visible above the web browser frame. The web browser would display a no-cookie icon if no cookies are set for the path. When the user selects the cookie icon, the browser displays a dialog box showing all the stored cookie values for the URL or path. A spreadsheet display in the dialog box shows the attributes of each cookie and scroll bars may be used to let the user browse all the values. Buttons at the bottom of the dialog box may allow the user to delete or modify an existing cookie value. If desired, the cookie display routine may allow additional cookie values to be set. In addition, the cookie display routine may allow the user to view, edit, or delete all cookie values, not just ones for the current URL.

If desired, the cookie data display routine enables a user to block all cookies from a particular site, such as a web server that returns nothing but advertisement graphics to subscribing URLs. In the prior art, as previously noted, the user does not have control over accepting or denying cookies for a particular site.

Figure 2:
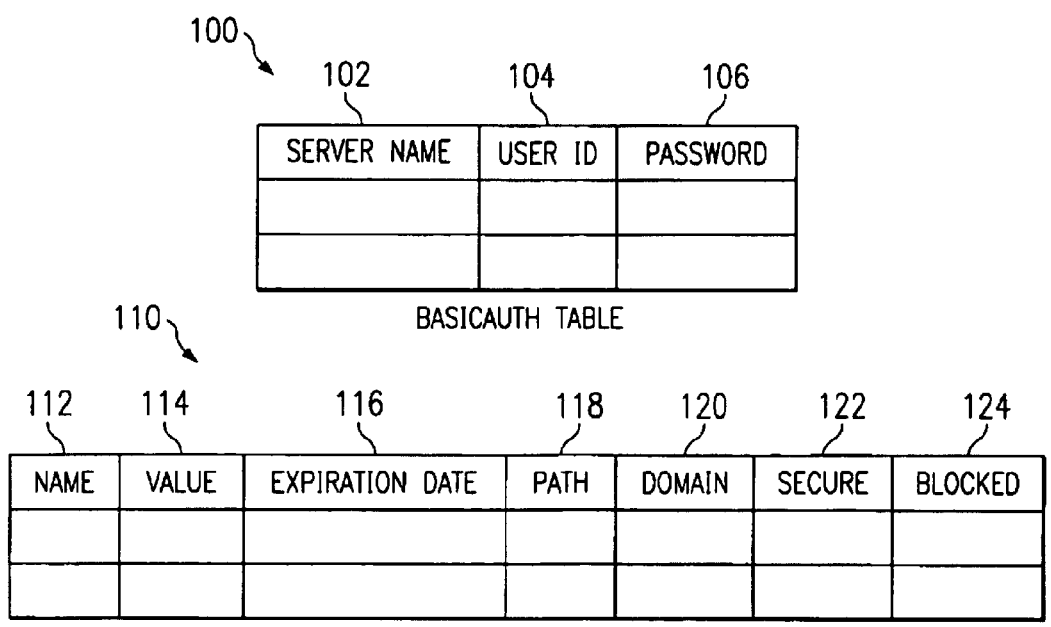
FIG. 2 illustrates the basic data structures for use in the present invention.

FIG. 2 shows representative data structures used in this invention. These structures are maintained in system or other memory (e.g., a hard disk). A BasicAuth Table 100 stores entries related to HTTP basic authentication. Each entry contains a number of data columns, including the server or domain name 102, userid 104 and password 106 that should be sent to the server. The realm name and other attributes may be included as well. A CookieData Table 110 stores entries related to cookies stored by the web browser on behalf of given web servers. Each entry contains a number of data columns, including the name 112 and value 114 of the cookie, the date that the cookie expires 116, and the path 118 and domain 120 for which the cookie is valid. Each entry also includes a secure flag 122, indicating if the cookie should be sent as part of a secure transaction, and a blocked flag 124, indicating if the cookie should be sent by the browser to the matching domain and path.

Figure 3:
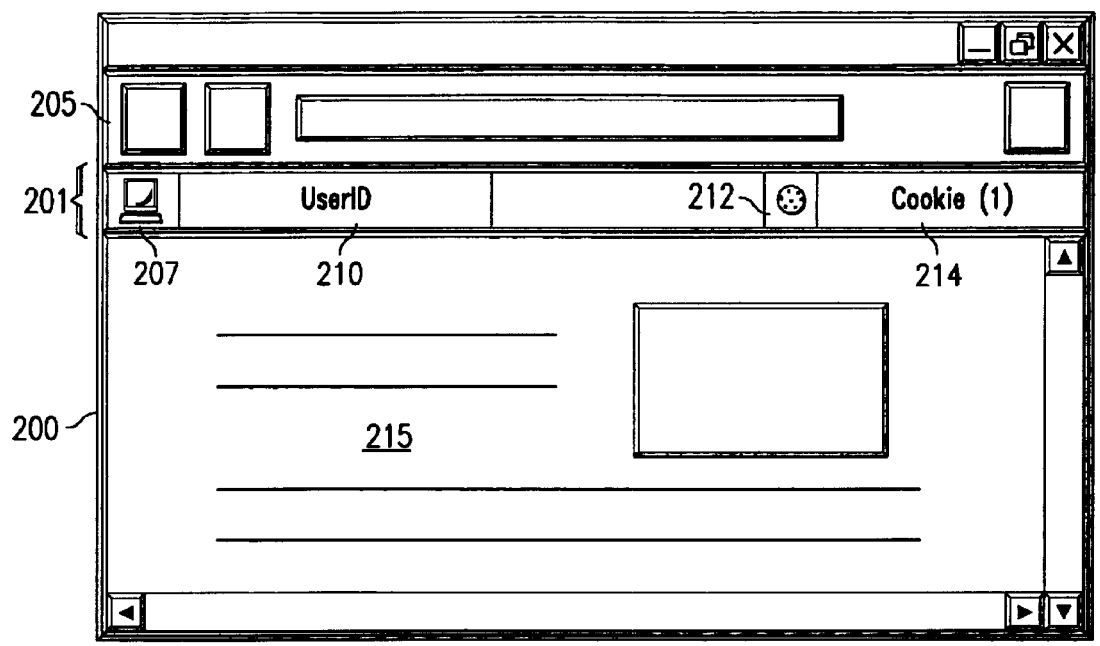
FIG. 3 is an illustrative web browser user interface according to the present invention.

FIG. 3 illustrates how the display routines alter the conventional web browser user interface according to the present invention. This illustration is merely representative as any convenient user interface resources may be used. In the illustrative example, the web browser 200 has an entry and menu area 205 and visual area 215 where the HTML file or other graphics are displayed in the usual manner. A status bar 201, which could reside above or below the visual area, shows a logon icon 207 and userid 210 for the basic authentication transaction that matches the server or domain name. According to the present invention, the presence of the logon icon and userid indicate that the browser sent the userid and its accompanying password to the web server in the targeted URL. The status bar also contains a cookie icon 212 indicating that the browser sent cookies with the transaction along with the number of cookies sent 214. The presence of the cookie icon and cookie value or count indicates that the browser sent one or more cookies to the web server or domain in the targeted URL and path.

Figure 4:
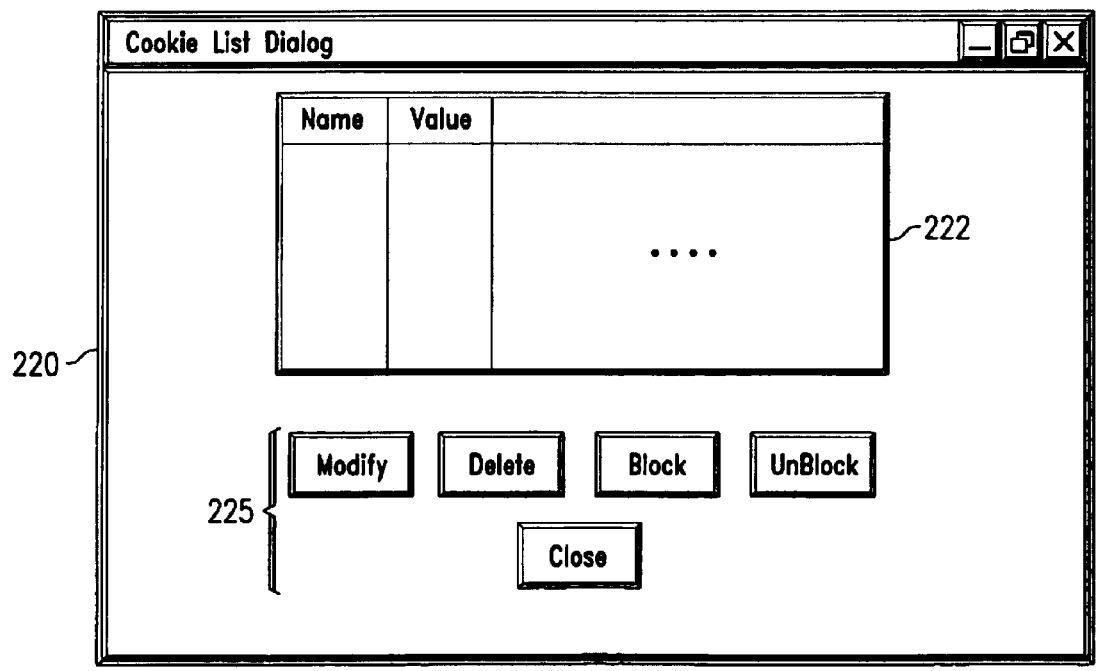
FIG. 4 illustrates a representative Cookie List Dialog panel.
Figure 5:
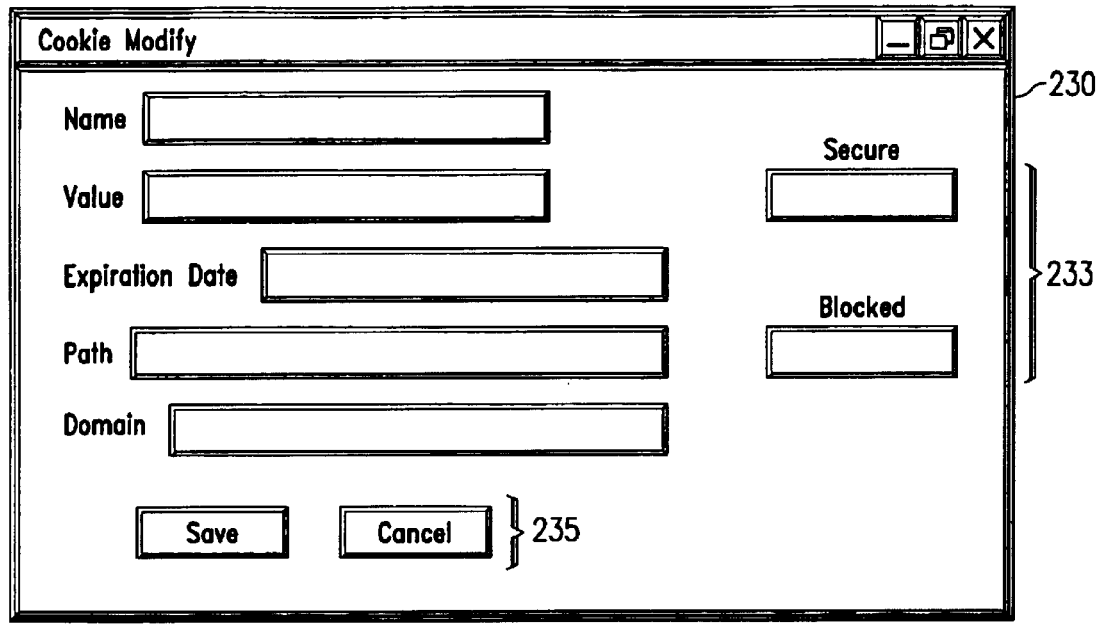
FIG. 5 illustrates a representative Cookie Modify Dialog panel.

When the user clicks on the cookie icon 212, a Cookie List Dialog 220 is displayed as illustrated in FIG. 4. The Dialog 220 presents a list of all the cookies that were sent to the matching domain and path. The cookie attributes 222 are shown in a list with all the possible actions represented as buttons 225 at the bottom of the dialog. When the user selects the Modify button, for example, a Cookie Modify Dialog 230 is displayed as illustrated in FIG. 5. The Dialog 230 allows the user to modify a selected cookie. The cookie attributes 233 are shown with modification fields and check boxes with all the possible actions represented as buttons 235 at the bottom of the dialog. Of course, one of ordinary skill in the art will appreciate that selection of the other buttons in the Cookie List Dialog allow the user to control other cookie data using similar dialog screens.

Figure 6B:
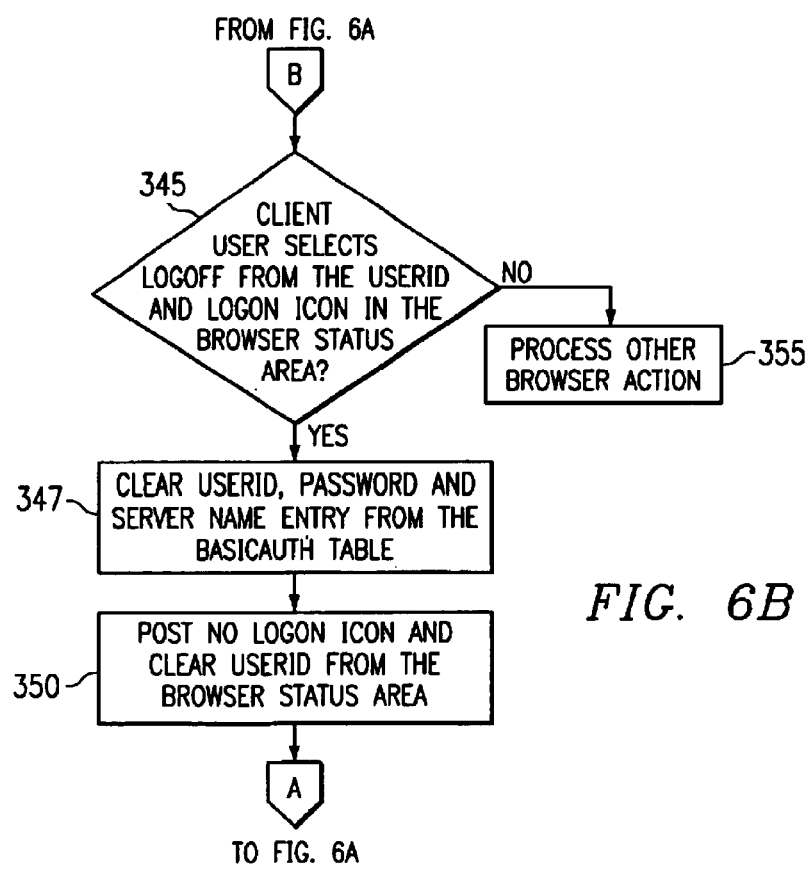
FIGS. 6A–6B are a composite flowchart illustrating how basic authentication information is handled by the present invention and how a user can view associated attributes or logoff.
Figure 6A:
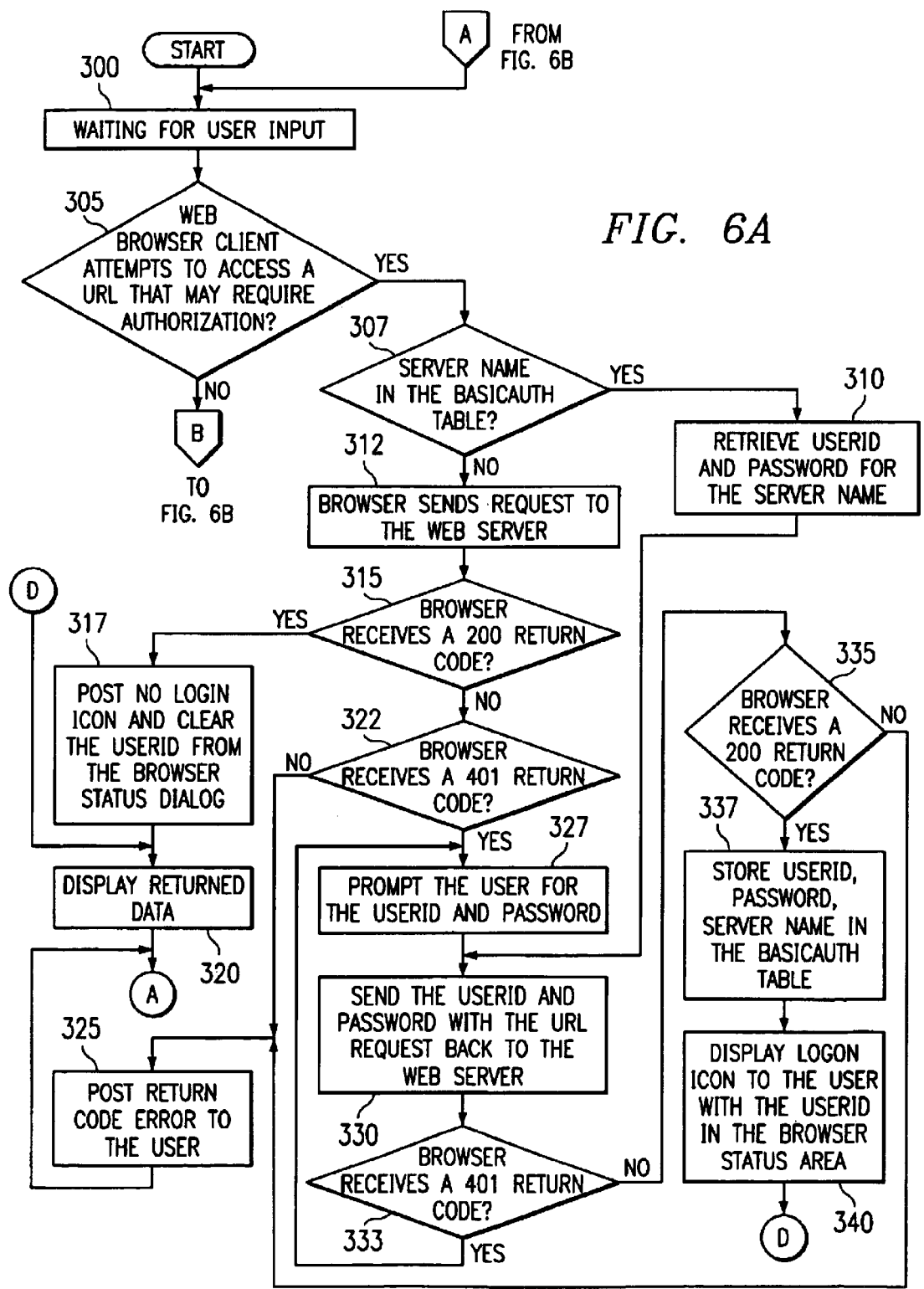

FIGS. 6A and 6B show the flow of how basic authentication information is handled by the basic authentication data display routine and how the user can view the associated attributes or logoff. Processing begins at step 300 where the browser waits for user input. Once the user has supplied input, processing continues at decision step 305 where the user utilizes the web browser to attempt to access a URL that may require authorization. If the user attempts to access a URL, processing continues at step 307; otherwise, control moves to step 345. At step 307, the browser checks to see if the server or domain name exists in the BasicAuth Table. If the outcome of the test at step 307 is positive, control continues at step 310. At this point, the browser retrieves the userid and password for the matching server name and continues at step 330. If there is no entry in the BasicAuth Table, processing continues at step 312, where the browser sends the URL request to the web server. The process flow then continues at decision step 315. In particular, at step 315, the web browser checks to see if it received an 200 or OK HTTP return code from the web server. If so, the browser displays the no logon icon and clears the userid value from the browser's status area. This is step 317. Next, the browser displays the returned data at step 320 and proceeds back to step 300.

If the browser did not receive a 200 HTTP return code at decision step 315, processing continues to decision step 322, where the web browser checks to see if it received a 401 or Unauthorized HTTP return code from the web server. If not, the browser continues to step 325 where it posts the return code error to the user. Next, the browser proceeds back to step 300. If, however, the browser received a 401 HTTP return code at decision step 322, the web browser prompts the user for a userid and password. Next, at step 330, the browser sends the userid and password with the URL request back to the web server. The process flow then continues at decision step 333 where the browser checks if it received a 401 HTTP return code. If so, control returns to step 327. If not, the process flow continues to decision step 335.

At step 335, the browser checks if it received a 200 HTTP return code. If not, control proceeds to step 325. If the outcome of the test at step 335 is positive, control continues at step 337, where the routine stores the userid, password, and the associated server or domain name in the BasicAuth table. Next, at step 340, the browser displays the logon icon and the userid in the status area and proceeds to step 320. At step 345, the browser checks if the user selected the logoff action from a menu pull down from the logon and userid values in the browser status area. If not, some other action was taken and the browser processes it at step 355. If the outcome of the test at step 345 is positive, the browser clears the userid, password, and associated server or domain name in the BasicAuth table. This is step 347. Next, at step 350, the browser displays the no logon icon and clears the userid from the browser status area before returning to step 300.

Figure 7:
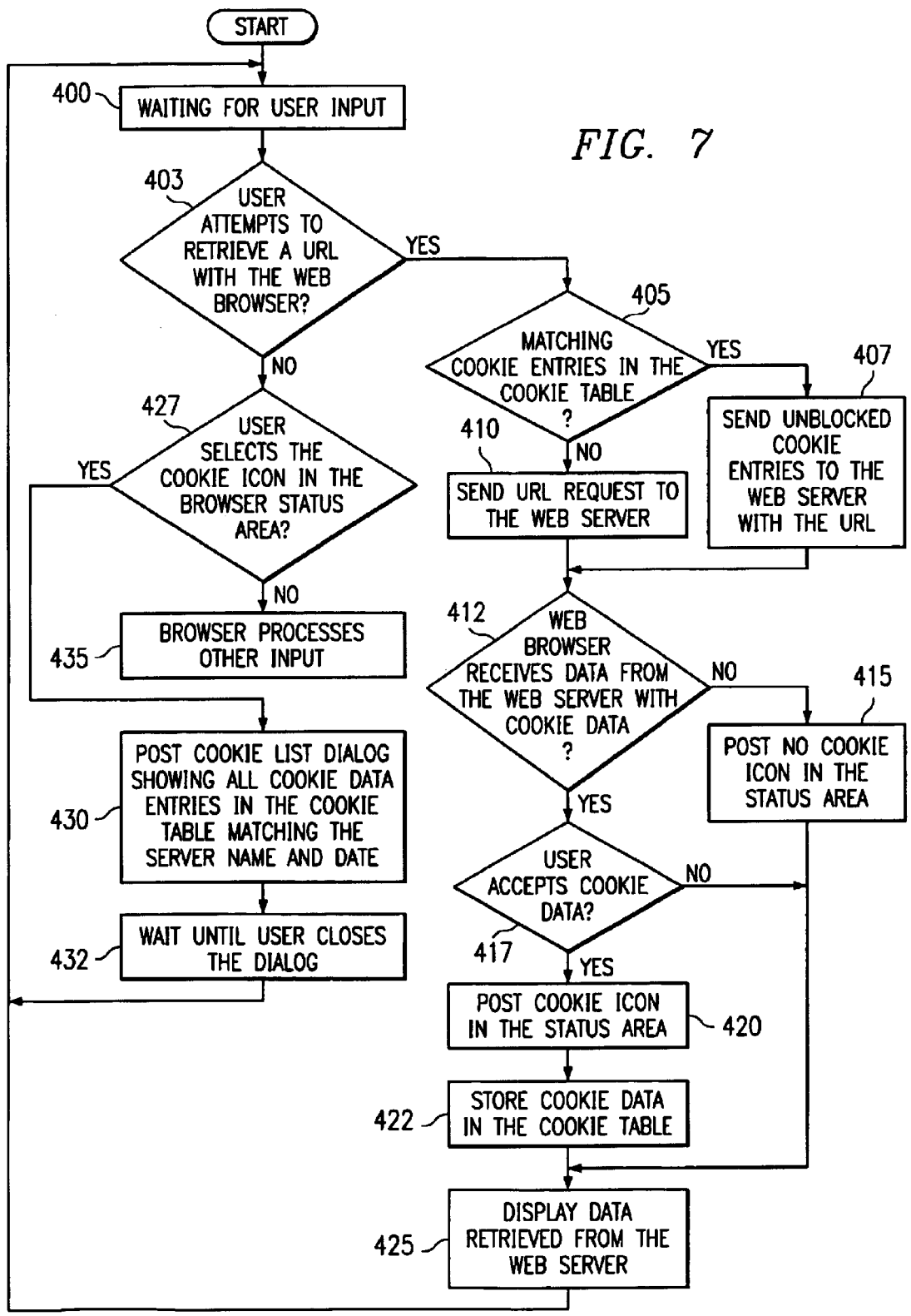
FIG. 7 is a flowchart illustrating how cookie data is handled by the present invention and how the user can view associated cookies for a domain and path.

FIG. 7 is a flowchart illustrating how cookie data is handled by the cookie data display routine and how the user can view the associated cookies for a domain and path. Processing begins at step 400 where the browser waits for user input. Once the user has made an input, processing continues to decision step 403 where the user attempts to retrieve a URL with the web browser. If the user attempts to access a URL, processing continues to decision step 405; otherwise, control continues at decision step 427.

At step 405, the browser checks to see if the domain and path have entries in the Cookie Table. If the outcome of the test at step 405 is positive, control continues at step 407. At this step, the browser retrieves the matching cookie data whose entries are unblocked to the web server with the URL. Processing then continues at step 412. If there are no entries in the Cookie Table, the test at step 405 is negative and processing continues to step 410. At this point in the control routine, the web browser sends the URL request without cookie data to the web server. Processing then continues at step 412. At this step, the web browser received data from the web server and checks if it also received cookie data. If the outcome of step 412 is negative, the browser checks if there are matching cookie entries in the Cookie Data Table at step 413. If not, the browser displays no cookie icon and clears the cookie number value in the status area at step 415. Process flow then continues at step 425. If there are matching cookie entries in the Cookie Data Table, the browser posts the cookie icon in the status area at step 414, and control then continues at step 425.

If the browser received cookie data, which is indicated by a positive outcome at step 412, the browser continues to decision step 417 where the user may be prompted to accept the cookie data. The user could also have set the browser settings to automatically accept or reject cookie data. If the user did not accept the cookie data, process flow continues at step 425. If the user did accept the cookie data, process flow continues at step 420, where the browser posts the cookie icon and number of matching cookies in the status area. Next, at step 422, the browser stores the one or more cookie entries in the CookieData Table. Process flow then continues at step 425, where the browser displays the data retrieved from the web server in its visual area. The process flow then returns to step 400.

At decision step 427, the browser checks if the user selected the cookie icon or number in the status area. If not, the user performed another action in the browser, which action is then processed at step 435. If the outcome of step 427 is positive, at step 430, the browser posts the Cookie List Dialog showing all entries in the CookieData Table matching the server or domain name and path. Next, the browser waits for the Cookie List Dialog to close at step 432. Flow then continues back at step 400. This completes the processing.

Figure 8:
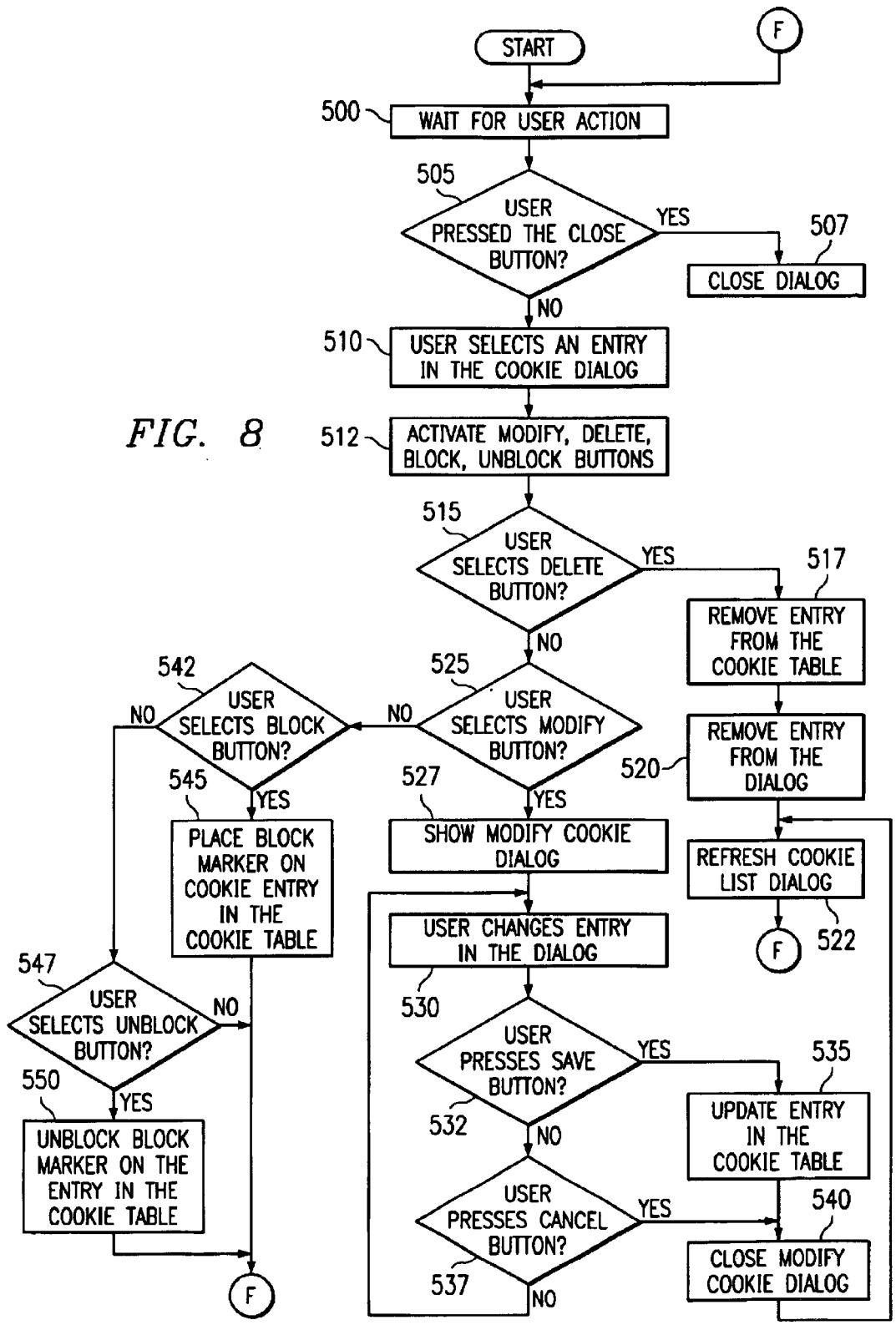
FIG. 8 is a flowchart illustrating how matching cookie entries are displayed in a Cookie List dialog according to the present invention.

FIG. 8 is a flowchart illustrating how matching cookie entries are shown in the Cookie List Dialog and how the user can view or modify the cookie data. Processing begins at step 500, where the browser waits for user input. Once the user has made an input, processing continues at step 505, where the browser checks if the user pressed the close button on the dialog. If so, the browser closes the dialog at step 507 and returns. If the user has not checked the close button, the user currently has a cookie or has selected a cookie entry in the list at step 510. The selection or previous selection activates the modify, delete, block, and unblock buttons on the dialog at step 512, and processing continues to decision step 515.

At step 515, the browser checks if the user selected the delete button or the dialog. If not, processing continues to step 525. If the user has selected the delete button, processing continues at step 517, where the browser removes the selected cookie entry from the Cookie Data table. Next, at step 520, the browser removes the cookie entry from the Cookie List Dialog. The Cookie List Dialog is then refreshed at step 522. Process flow then continues back at step 500.

At step 525, the browser checks if the user selected the modify button on the dialog. If not, processing continues at step 542. If the user has selected the modify button, processing continues at step 527, where the browser displays the Modify Cookie Data Dialog. This dialog was illustrated above. The user changes entries in the Modify Cookie Data Dialog at step 530. The process flow then continues at step 532. If the user selects the save button for the Modify Cookie Data Dialog at step 532, the browser updates the corresponding cookie entry in the Cookie Data table at step 535. The browser closes the Modify Cookie Dialog at step 540 before proceeding to step 522. If the user did not select the save button at step 532, the browser checks if the user selected the cancel button in the Modify Cookie Data Dialog. This is step 537. If not, control returns to step 530. If the user selected the cancel button, the process flow continues at step 540.

At step 542, the browser checks if the user selected the block button an the dialog. If not, processing continues at step 547. If the user selected the block button, processing continues at step 545, where the browser changes the blocked attribute to an on state in the corresponding cookie entry in the Cookie Table. The process flow then returns to step 500. At step 545, the browser checks if the user selected the unblock button on the dialog. If not, processing returns to step 500. If the user has selected the unblock button, processing continues at step 550, where the browser changes the blocked attribute to an off state in the corresponding cookie entry in the Cookie Table. Flow then returns to step 500 to complete the processing.

The basic authentication and cookie data display routines are separate and independent. Thus, it is not required to display the cookie icon (and to provide the cookie data display functionality) while the browser displays the logon icon and userid. Likewise, it is not required to display the logon icon and userid (and to provide the basic authentication functionality) while the browser displays the cookie icon. Moreover, like the cookie data, the basic authentication routine may show all stored values for basic authentication userids and passwords, although passwords typically would not be displayed in plaintext. In addition, if desired, basic authentication userids and passwords could be remembered from one session to the next, although they should be encrypted if stored in a file.

Moreover, while the present invention has been illustrated in the context of a web browser, this inventive technique is not so limited. The functionality described above may implemented in any application that processes HTTP transactions.

The present invention provides significant advantages. The web browser user data control mechanism gives users more control over the information the web browser uses and keeps for and on them. Being able to view and change basic authentication userid and cookies gives the user the knowledge of what information is being kept by the browser and sent to the web server. The customized views to the current URL help provide more relevant information to the user. In addition, the basic authentication routine advantageously allows the clearing or constant display of the current userid.

As noted above, the inventive mechanism is preferably implemented in or as an adjunct to a web browser. Thus, the invention does not require any modifications to conventional server hardware or software. Although not meant to be limiting, the above-described functionality is preferably implemented as standalone native code or, alternatively, as a Java applet or application. Generalizing, the above-described functionality is implemented in software executable in a processor, namely, as a set of instructions (program code) in a code module resident in the random access memory of the computer. Until required by the computer, the set of instructions may be stored in another computer memory, for example, in a hard disk drive, or in a removable memory such as an optical disk (for eventual use in a CD ROM) or floppy disk (for eventual use in a floppy disk drive), or downloaded via the Internet or other computer network.

In addition, although the various methods described are conveniently implemented in a general purpose computer selectively activated or reconfigured by software, one of ordinary skill in the art would also recognize that such methods may be carried out in hardware, in firmware, or in more specialized apparatus constructed to perform the required method steps.

Further, as used herein, a Web "client" should be broadly construed to mean any computer or component thereof directly or indirectly connected or connectable in any known or later-developed manner to a computer network, such as the Internet. The term Web "server" should also be broadly construed to mean a computer, computer platform, an adjunct to a computer or platform, or any component thereof. Of course, a "client" should be broadly construed to mean one who requests or gets the file, and "server" is the entity which downloads the file.

Having thus described my invention, what I claim as new and desire to secure by Letters Patent is set forth in the following claims.

What is claimed is:

1. A method for displaying web browser information, comprising the steps of:

having a user logon to a given realm supported on a server by entering authentication data; and displaying, on a web browser frame of a web browser, given first information indicating that the web browser sent the authentication data to the server for a targeted URL.

2. The method as described in claim 1 wherein the given first information includes a userid, the display of the userid indicating that the web browser sent the userid to the server.

3. The method as described in claim 1 wherein the given first information includes a logon icon, the display of the logon icon indicating that the user has successfully executed a logon to the given realm and is currently logged-on.

4. The method as described in claim 1 wherein the given first information includes information identifying the realm.

5. The method as described in claim 1 further including the steps of:

responsive to the user later attempting to navigate to a restricted URL, displaying a new logon panel; and following logon by the user using the new logon panel, displaying given second information on the web browser frame, the given second information indicating that the web browser sent new authentication data to the server for the restricted URL.

6. The method as described in claim 3 further including the steps of:

responsive to the user taking a given action, displaying a logoff menu entry; and responsive to the user selecting the logoff menu entry, deleting a userid and password from a basic authentication table.

7. The method as described in claim 6 wherein the given action is selecting the logon icon.

8. A method for displaying web browser information, comprising the steps of:

having a user logon to a given realm supported on a server by entering authentication data;

displaying, on a web browser frame of a web browser, given first information indicating that the web browser successfully sent the authentication data to the server for a first targeted URL;

responsive to the user later attempting to navigate to a second targeted URL, displaying a new logon panel; and following logon by the user using the new logon panel, displaying, on the web browser frame, given second information indicating that the web browser successfully sent new authentication data to the server for the second targeted URL.

9. The method as described in claim 8 wherein the first given information includes a userid and the second given information includes a new userid.

10. The method as described in claim 8 wherein the given first information and the given second information includes a logon icon indicating that the user has successfully executed a login and is currently logged-on.

11. A computer program product in a computer-readable medium for displaying web browser information, comprising:

means responsive to a user logon to a given realm supported on a server for displaying, on a web browser frame of a web browser, given first information indicating that the web browser sent a userid and its accompanying password to the server for a first targeted URL;

means responsive to the user later attempting to navigate to a second traget URL for displaying a new logon panel; and means, responsive to logon by the user using the new logon panel, for displaying on the web browser frame, given second information indicating that the web browser sent a new userid and its accompanying password to the server for the second targeted URL.

12. The computer program product as described in claim 11 wherein the first given information includes the userid and the second given information includes the new userid.

13. The computer program product as described in claim 11 wherein the given first information and the given second information includes a logon icon indicating that the user has successfully executed a login and is currently logged-on.

14. The computer program product as described in claim 13 further including:

means responsive to the user taking a given action with respect to the logon icon for displaying a logoff menu entry;

means responsive to the user selecting the logoff menu entry for deleting the userid and password from a basic authentication table; and means for indicating that the user has logged off the given realm.

15. A computer program product for displaying web browser information, comprising:
   means responsive to a user logon to a given realm supported on a server for displaying, on a web browser frame of a web browser, an identifier of the user indicating that the web browser sent a userid and its accompanying password to the server for a targeted URL; and
   means for displaying, on the web browser frame, a logon icon to indicate that the user has successfully and is currently logged onto the given realm.

16. A client computer, comprising:
   a processor;
   system memory;
   a web browser; and
   an authentication data display routine, comprising:
      means responsive to a user logon to a given realm supported on a server for displaying, on a web browser frame of the web browser, an indicator to indicate that the web browser sent a userid and its accompanying password to the server for a targeted URL; and
      means for displaying, on the web browser frame, a logon icon to indicate that the user has successfully and is currently logged onto the given realm.

17. A method for displaying web browser information, comprising the steps of:
   connecting a user device to a targeted domain and path on a server, the user device having a web browser; and
   displaying, on a web browser frame of the web browser, given first information indicating that the web browser sent a cookie to the targeted domain and path on the server.

18. The method as described in claim 17 wherein the given first information includes a cookie icon.

19. The method as described in claim 17 wherein the given first information includes a count of a number of cookies sent to the server for the targeted URL.

20. The method as described in claim 17 further including the step of:
   responsive to the user taking a given action with respect to the cookie icon, displaying a list of one or more cookies sent to the server for the targeted URL.

21. The method as described in claim 20 further including the step of:
   displaying a control dialog to enable the user to modify a cookie identified in the list; and
   modifying cookie.

22. The method as described in claim 20 further including the step of:
   displaying a control dialog to enable the user to delete a cookie identified in the list; and
   deleting the cookie.

23. The method as described in claim 20 further including the step of:
   displaying a control dialog to enable the user to block a cookie identified in the list; and
   blocking the cookie.

24. The method as described in claim 20 further including the step of:
   displaying a control dialog to enable the user to unblock a cookie identified in the list; and
   unblocking the cookie.

25. A method for operating an apparatus having a web browser, comprising the steps of:
   responsive to a user attempt to retrieve a URL with the web browser, determining whether the URL matches at least a portion of an entry in a table and if so, retrieving cookie data from the entry if it is determined that the entry is marked in the table as unblocked; and
   sending the cookie data with the URL to a server.

26. The method as described in claim 25 further including the steps of:
   responsive to receipt of data from the server, determining whether the data includes new cookie data;
   if the data includes new cookie data, determining whether the user desires to accept the new cookie data and if so, displaying a cookie icon on a frame of the web browser.

27. The method as described in claim 26 further including the steps of:
   responsive to the user taking a given action with respect to the cookie icon, displaying a list of cookies for the URL.

28. The method as described in claim 27 further including the steps of:
   displaying a control dialog to enable the user to take a given action with respect a cookie identified in the list; and
   taking the given action.

29. The method as described in claim 28 wherein the given action is modifying the cookie.

30. The method as described in claim 28 wherein the given action is deleting the cookie.

31. The method as described in claim 28 wherein the given action is setting the cookie as blocked.

32. The method as described in claim 28 wherein the given action is setting the cookie as unblocked.

33. A computer program product in a computer-readable medium comprising:
   means, responsive to a user device connecting to a targeted domain and path on a server, for displaying on a web browser frame of a web browser, information indicating that the web browser sent a cookie to the targeted domain and path on the server; and
   means, operative in a current web browser session, for displaying a list of cookies sent to the targeted domain and path on the server.

34. The computer program product as described in claim 33 further including means for modifying a cookie identified in the list.

35. The computer program product as described in claim 33 further including means for deleting a cookie identified in the list.

36. The computer program product as described in claim 33 further including means for setting a cookie in the list as blocked.

37. The computer program product as described in claim 33 further including means for setting a cookie in the list as unblocked.

38. A computer program product in a computer-readable medium, comprising:
   means responsive to a user attempt to retrieve a URL with a web browser for determining whether the URL matches at least a portion of an entry in a table;

means, responsive to a match of the URL with at least a portion of the entry, for retrieving cookie data from the entry if it is determined that the entry is marked in the table as unblocked; and means for sending the cookie data with the URL to a server.

39. The computer program product as described in claim 38 further including:

means responsive to receipt of data from the server for determining whether the data includes new cookie data;

means responsive to a determination that the data includes new cookie data for determining whether the user desires to accept the new cookie data; and means, responsive to a determination that the user desires to accept the new cookie data, for displaying a cookie icon on a frame of the web browser.

40. The computer program product as described in claim 39 further including:

means responsive to the user taking a given action with respect to the cookie icon for displaying a list of cookies for the URL.

41. The computer program product as described in claim 40 further including:

means for displaying a control dialog to enable the user to take a given action with respect a cookie identified in the list; and means responsive to user input for taking the given action.

42. The computer product program as described in claim 41 wherein the given action is selected from a set of given actions consisting of: modifying a cookie in the list, deleting a cookie in the list, setting a cookie in the list as blocked, and setting a cookie in the list as unblocked.

* * * * *

UNITED STATES PATENT AND TRADEMARK OFFICE
CERTIFICATE OF CORRECTION

PATENT NO. : 6,851,060 B1　　　　　　　　　　　　　　　　　　　　　　　　Page 1 of 1
APPLICATION NO. : 09/353950
DATED : February 1, 2005
INVENTOR(S) : Shrader It is certified that error appears in the above-identified patent and that said Letters Patent is hereby corrected as shown below:

OTHER PUBLICATIONS, line 5: after "World" insert --Wide--.

Col. 10, line 43: after "second" delete "traget" and insert --target--.

Signed and Sealed this

First Day of August, 2006

JON W. DUDAS
*Director of the United States Patent and Trademark Office*